(12) United States Patent
Mestanov et al.

(10) Patent No.: US 12,193,057 B2
(45) Date of Patent: *Jan. 7, 2025

(54) METHOD AND ENTITY FOR TRANSMITTING IN A COMMUNICATIONS SYSTEM

(71) Applicant: Telefonaktiebolaget LM Ericsson (publ), Stockholm (SE)

(72) Inventors: Filip Mestanov, Brottby (SE); Johan Söder, Stockholm (SE); Soma Tayamon, Stockholm (SE); Yu Wang, Solna (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,385

(22) Filed: Jul. 28, 2023

(65) Prior Publication Data

US 2024/0023163 A1  Jan. 18, 2024

Related U.S. Application Data

(63) Continuation of application No. 17/358,102, filed on Jun. 25, 2021, now Pat. No. 11,751,244, which is a (Continued)

(51) Int. Cl.
*H04W 74/08* (2024.01)
*H04W 72/566* (2023.01)
(Continued)

(52) U.S. Cl.
CPC ..... *H04W 74/0816* (2013.01); *H04W 72/566* (2023.01); *H04W 74/0808* (2013.01); *H04W 16/14* (2013.01); *H04W 84/12* (2013.01)

(58) Field of Classification Search
CPC .......... H04W 74/0816; H04W 72/566; H04W 74/0808; H04W 16/14; H04W 84/12
See application file for complete search history.

(56) References Cited

U.S. PATENT DOCUMENTS

| 6,571,084 B1 | 5/2003 | Jabbary |
| 2008/0192644 A1 | 8/2008 | Utsunomiya et al. |

(Continued)

FOREIGN PATENT DOCUMENTS

| EP | 2 717 644 | 9/2014 |
| EP | 2 993 953 | 3/2016 |
| WO | 2007027442 | 3/2007 |

OTHER PUBLICATIONS

International Search Report and Written Opinion issued in International Application No. PCT/SE2015/050831, dated Mar. 30, 2016, 12 pages.

(Continued)

*Primary Examiner* — Shukri Taha
(74) *Attorney, Agent, or Firm* — Rothwell, Figg, Ernst & Manbeck, P.C.

(57) ABSTRACT

A method performed in an entity for transmitting in a communications system. The method comprises assessing a channel to be available for transmission by establishing an on-going transmission to have a received signal strength such as to allow simultaneous transmission in view of a first clear channel assessment threshold; establishing type of transmission of the on-going transmission; and determining, based on the established type of transmission, whether to transmit or to defer transmitting. A corresponding entity, computer programs and computer program products are also provided.

21 Claims, 6 Drawing Sheets

Related U.S. Application Data continuation of application No. 16/454,992, filed on Jun. 27, 2019, now Pat. No. 11,064,525, which is a continuation of application No. 15/746,722, filed as application No. PCT/SE2015/050831 on Jul. 22, 2015, now Pat. No. 10,375,732.

(51) Int. Cl.
*H04W 74/0808* (2024.01)
*H04W 74/0816* (2024.01)
*H04W 16/14* (2009.01)
*H04W 84/12* (2009.01)

(56) References Cited

U.S. PATENT DOCUMENTS

| | | |
|---|---|---|
| 2013/0235737 A1 | 9/2013 | Merlin et al. |
| 2014/0293905 A1 | 10/2014 | Tian et al. |
| 2015/0009907 A1 | 1/2015 | Merlin |
| 2015/0032868 A1 | 1/2015 | Sung |
| 2015/0124744 A1 | 5/2015 | Zhu et al. |
| 2015/0163824 A1 | 6/2015 | Krzymien et al. |
| 2015/0296528 A1 | 10/2015 | Coffey et al. |
| 2016/0056929 A1* | 2/2016 | Kwon ............... H04W 74/0808 370/338 |
| 2016/0081010 A1 | 3/2016 | Seok |
| 2016/0135224 A1 | 5/2016 | Lee |
| 2016/0135225 A1 | 5/2016 | Kwon et al. |
| 2016/0381706 A1 | 12/2016 | Huang |
| 2017/0142753 A1 | 5/2017 | Wang et al. |
| 2017/0188336 A1 | 6/2017 | Ahn |
| 2017/0195991 A1 | 7/2017 | Ahn |
| 2017/0294949 A1* | 10/2017 | Zhang .................. H04W 52/46 |

OTHER PUBLICATIONS

Hedayat, R. et al., "Uplink MU Transmission and Coexistence", doc.: IEEE 802.11-15/86rl, NEWRACOM, Jan. 12, 2015, 11 pages.
Hedayat, R. et al., "Channel Sensing in UL-OFDMA", doc.: IEEE 802.11-15/378rl, NEWRACOM, Mar. 9, 2015, 10 pages.
Supplementary European Search Report issued in European Patent Application No. 15 89 9038.2 dated Jul. 2, 2018, 4 pages.

* cited by examiner

METHOD AND ENTITY FOR TRANSMITTING IN A COMMUNICATIONS SYSTEM

CROSS-REFERENCE TO RELATED APPLICATIONS

This application is a continuation of U.S. patent application Ser. No. 17/358,102, filed on Jun. 25, 2021 (now U.S. Pat. No. 11,751,244, issued on Sep. 5, 2023), which is continuation of U.S. patent application Ser. No. 16/454,992, filed on Jun. 27, 2019 (now U.S. Pat. No. 11,064,525, issued on Jul. 13, 2021), which is a continuation of U.S. patent application Ser. No. 15/746,722, having a section 371 (c)(1) date of Jan. 22, 2018 (now U.S. Pat. No. 10,375,732, issued on Aug. 6, 2019), which is the national stage of International patent application No. PCT/SE2015/050831, filed Jul. 22, 2015. The above identified applications and publication are incorporated by this reference.

TECHNICAL FIELD

The technology disclosed herein relates generally to the field of wireless communications networks, and in particular to methods for handling transmissions in such networks.

BACKGROUND

Wi-Fi, also known as Wireless Local Area Network (WLAN), is a technology that currently mainly operates on the 2.4 GHz or the 5 GHz band. There are specifications regulating an access points' or wireless terminals' physical (PHY) layer, medium access layer (MAC) layer and other aspects in order to secure compatibility and inter-operability between different WLAN entities, e.g. between an access point and mobile terminals, both of which may be referred to as stations (STAs) in the following. Wi-Fi is generally operated in unlicensed bands, and as such, communication over Wi-Fi may be subject to interference sources from any number of known and unknown devices. Wi-Fi is commonly used as wireless extensions to fixed broadband access, e.g., in domestic environments and hotspots, like airports, train stations and restaurants.

The WLAN technology relies on a procedure known as Carrier Sensing Multiple Access with Collision Avoidance (CSMA/CA) in order to efficiently and in a fair way share the wireless medium among the different WLAN entities (STAs) and among different Radio Access Technologies (RATs). The CSMA/CA procedure applied in the WLAN system demands that each entity that wishes to send data senses the common communication channel before performing a transmission. Such sensing, or scanning, is done in order to avoid that simultaneous transmissions are made, which usually results in loss of data and need for retransmissions.

FIG. 1 illustrates, in a simplified manner, a clear channel assessment (CCA), applied by a STA that has a frame to transmit (box 1). In order to assess if a channel is busy, the STA starts scanning (box 2) the channel. If the STA detects a transmission, it establishes the received signal strength thereof. If the received signal strength is higher than a pre-determined threshold, referred to as Clear Channel Assessment threshold (CCAT), then the STA deems the channel as busy and defers its own transmission (box 3). If the STA does not detect any such received signal strength, it assumes the channel to be idle and transmits the frame (box 4).

FIG. 2 illustrates an example of a Basic Serving Set (BSS) comprising an access point AP and a number of user entities (indicated STA A, STA B in the figure) located within a coverage area C1 (also denoted cell) being served by the AP. When, for instance, the access point (AP) has something to transmit, it performs the CCA procedure. All other transmitting entities STA A, STA B within its service area C1 will then, at least in a simplified propagation environment, cause the AP to defer its transmissions. It awaits a random back-off time period and then performs the CCA again.

In current systems a common CCAT is defined for each AP to be used when performing channel sensing for transmission to any of the entities STA A, STA B, associated to the AP. The entities STA A, STA B also use this common CCAT as criterion for deciding whether or not to transmit a frame.

With such static CCAT, a STA (APs and other entities) may refrain from accessing the wireless medium since it is also exposed to transmissions in neighboring AP areas, although simultaneous transmissions would be possible without increased risk of lost packets and subsequent retransmissions. This limits the performance of the current systems, especially as the CCAT used today is set rather conservatively to −82 dBm.

The use of dynamic thresholds has therefore been discussed. If the STAs could adapt their carrier sensing threshold dynamically then the amount of simultaneous transmissions in the system might be increased without significantly increasing the probability of collisions within and between the different areas.

Referring again to FIG. 1, when an entity has a frame to transmit (box 1), it again assesses if a channel is busy by scanning (box 2) the channel. However, in the case of a dynamic CCAT, instead of the fixed CCAT (exemplified by −82 dBm in the figure) the entity uses the dynamically set CCAT for establishing whether the received signal strength level is such that the entity should defer its transmission or perform the transmission. Various suggestions have been presented on how to set the dynamic thresholds. Some studies have shown that adjusting the CCAT to a more aggressive value provides throughput increases for both the mean and 5th percentile user throughputs.

Even though the dynamic adjustment of the CCAT would, in many scenarios, lead to improved system performance in terms of spectrum usage and system throughput, there is a tendency of also increasing the number of failed transmissions. The reason for this is that when a certain STA (either AP or non-AP STA) attempts to use the channel by applying a more aggressive channel access mechanism and then transmit simultaneously with an already on-going transmission, it creates additional interference which might lead to losses for the on-going transmission and resulting in retransmissions.

There is a need for improving system throughput and spectrum usage by enabling simultaneous transmissions while still keeping the number of re-transmissions to a minimum.

SUMMARY

An objective of the present teachings is to address the above issue and to solve the above mentioned problem.

The objective is according to an aspect achieved by a method performed in an entity for transmitting in a communications system. The method comprises assessing a channel to be available for transmission by establishing an on-going transmission to have a received signal strength such as to allow simultaneous transmission in view of a first clear channel assessment threshold; establishing type of transmission of the on-going transmission; and determining, based on the established type of transmission, whether to transmit or to defer transmitting.

The method provides a mechanism for e.g. a WLAN system to exclude certain types of high-impact transmissions from being subject to the trade-off between, on the one hand, spatially reusing the channel and thereby improving spectral efficiency and user and/or system throughput, and, on the other hand, increasing the number of failed transmissions, which is inherent to the channel access that is based on dynamic CCAT control.

In an embodiment, the determining comprises determining to defer transmitting if the type of transmission comprises a first type and else determining to transmit simultaneously. The first type of transmission may, for instance, comprise a transmission that is of high importance and/or high impact in some sense, e.g. a transmission comprising control information or a transmission to multiple users, which, if lost, would cause high impact by causing many retransmissions. An entity wanting to perform a transmission and checking if the channel is available will refrain from transmitting even though it would be allowed to transmit based on the use of dynamic adjustment of the CCAT. Thereby these high-importance or high-impact transmissions are protected from being subjected to increased interference and the accompanying increased risk of being lost.

In some embodiments, the determining is further based on a second clear channel assessment threshold and the determining comprises determining to transmit simultaneously if the on-going transmission has a received signal strength such as to allow simultaneous transmission in view of the second clear channel assessment threshold. For instance, the first clear channel assessment threshold may be a threshold of a dynamically adjusted CCAT method. If the on-going transmission is established to have a received signal strength such as to allow simultaneous transmission in view of the first CCAT (i.e. channel is clear), but that the type of transmission is such that the entity would need to defer its transmission, another check may be performed which is less aggressive in allowing channel reuse. The second check may use a conservative threshold whereby the transmission of the entity wishing to transmit would cause limited interference to the on-going transmission. An even further increased channel reuse is obtained while still protecting e.g. high-importance or high-impact transmissions.

The objective is according to an aspect achieved by a computer program for an entity for handling transmissions. The computer program comprises computer program code, which, when executed on at least one processor on the entity causes the entity to perform the method as above.

The objective is according to an aspect achieved by a computer program product comprising a computer program as above and a computer readable means on which the computer program is stored.

The objective is according to an aspect achieved by an entity for transmitting in a communications system. The entity is configured to: assess a channel to be available for transmission by establishing an on-going transmission to have a received signal strength such as to allow simultaneous transmission in view of a first clear channel assessment threshold; establish type of transmission of the on-going transmission; and determine, based on the established type of transmission, whether to transmit or to defer transmitting.

Further features and advantages of the embodiments of the present teachings will become clear upon reading the following description and the accompanying drawings.

DETAILED DESCRIPTION

Figure 1:
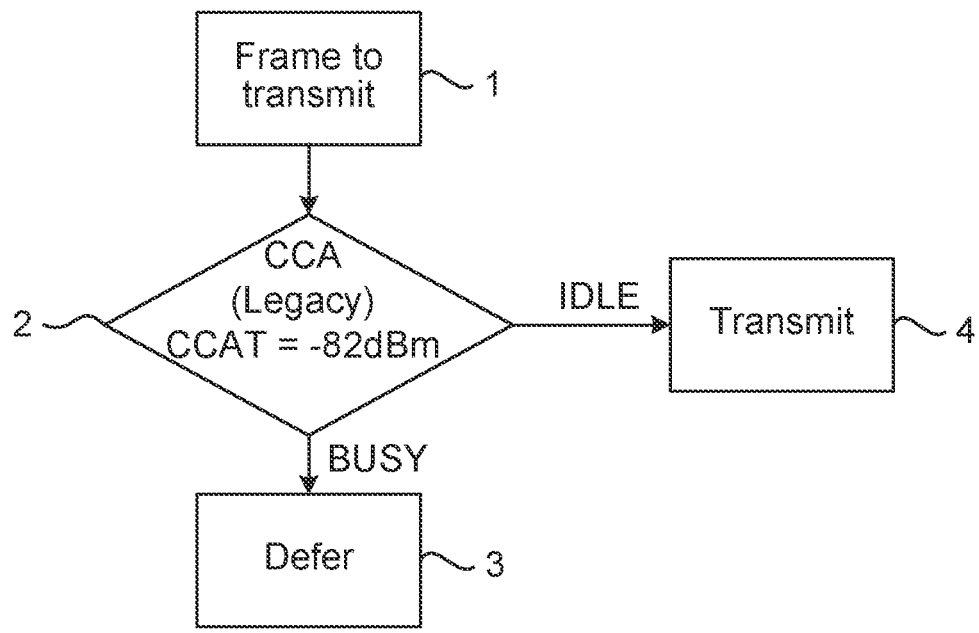
FIG. 1 is a flow chart illustrating principles of a clear channel assessment in a wireless network.
Figure 2:
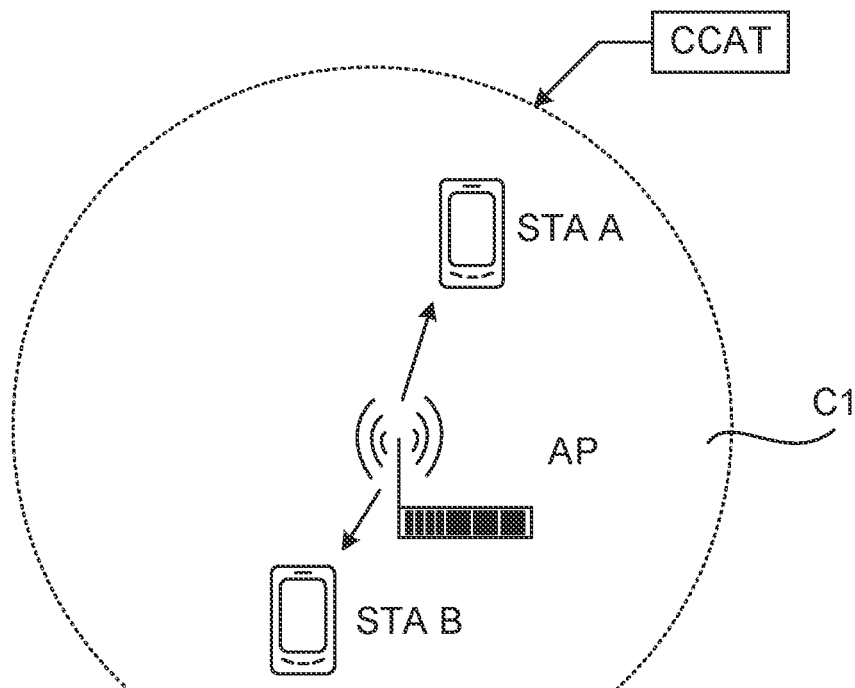
FIG. 2 illustrates a wireless network in which clear channel assessment is used.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

The inventors behind the present teachings have pinpointed an existing trade-off between possible channel reuse, i.e. possibility of performing a transmission simultaneously with on-going transmissions, and the creation of additional interference to the on-going transmissions, and provided methods and devices for improving on the situation for both parts, i.e. for the transmitting part and the part wanting to transmit simultaneously.

According to the present teachings, certain types of transmissions, referred to as "high-impact transmissions" herein, are given special consideration when channel access is performed based on dynamic sensitivity thresholds adjustment. There may be various reasons for giving special consideration for certain types of transmission (and not to others). A transmission may for instance be categorized as a high-impact transmission based on the number of users being addressed by the particular transmission. The transmission may, for instance, be an orthogonal frequency division multiple access (OFDMA) transmission or multi-user multiple-input multiple-output (MU-MIMO) transmission. Other examples on a high-impact transmission comprise the importance of the information being carried in the transmission, e.g. control messages such as request to send (RTS) message, clear to send (CTS) message, acknowledgement (ACK) messages, etc.

In various embodiments according to the present teachings, a method for selective dynamic sensitivity threshold adjustment is provided, whereby channel access based on dynamic sensitivity threshold adjustment is disallowed if the on-going transmission is considered to be a high-impact transmission. Thus, the reliability of high-impact transmissions is improved and these transmissions are not affected by the trade-off outlined earlier.

Figure 3:
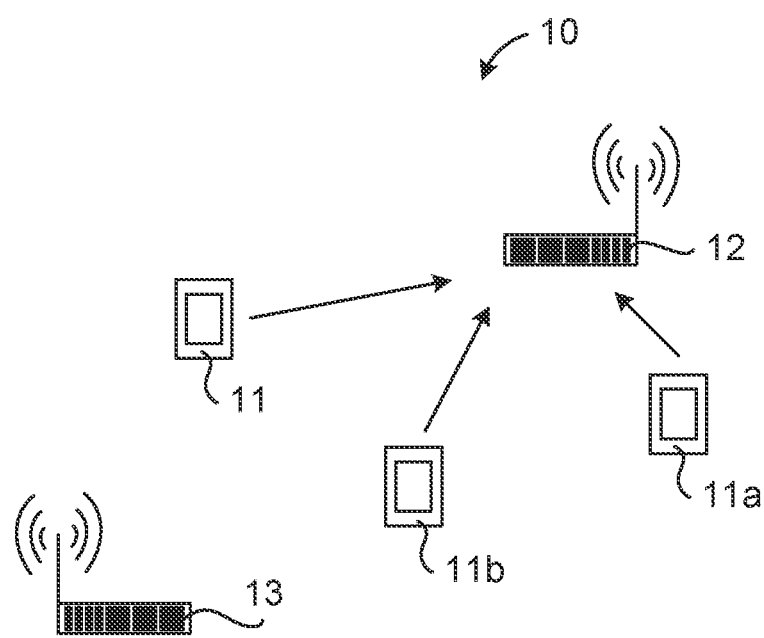
FIG. 3 illustrates schematically an environment in which embodiments according to the present teachings may be implemented.

FIG. 3 illustrates schematically an environment in which embodiments according to the present teachings may be implemented. A wireless communications system 10 is illustrated, which may comprise e.g. a Wi-Fi network, also known as WLAN (the terms are used interchangeably herein). WLAN is standardized in the 802.11 specifications, in particular in IEEE Standard for Information technology—Tele-communications and information exchange between systems. Local and metropolitan area networks—Specific requirements. Part 11: Wireless LAN Medium Access Control (MAC) and Physical Layer (PHY) Specifications).

As a note on vocabulary, a station (STA) may be an access point (AP) providing access to user stations or it may be a user station STA, i.e. a non-AP STA. The method described herein is applicable to, and may be implemented in, all entities (APs and non-APs) that want to transmit in a wireless communications system, e.g. a WLAN.

The wireless communications system 10 may comprise a number of STAs 11, 11a, 11b, 12, 13, including APs 12, 13 as well as user stations 11, 11a, 11b (non-AP STAs). Each AP 12, 13 have a number of STAs 11a, 11b, 11c associated to it.

The STAs 11, 12 of the wireless communications system 10 are arranged to (e.g. configured to) perform CCA based on dynamic adjustment of the used CCAT. The CCAT may be dynamically selected in various ways, e.g. depending on load in a STA (in particular load in AP), based on throughput for STAs, distance between transmitting and receiving STAs etc. The dynamic CCATs could, for instance, be set per frame or per some time unit.

In an embodiment according to the present teachings, when a STA 11, 12 (either an AP STA or a non-AP STA) performs a clear channel assessment, it employs a mechanism for selective dynamic sensitivity threshold adjustment, by which it applies an additional consideration, in particular considers the type of the on-going transmission that it has detected. If the on-going transmission is determined to be a high-impact transmission, it does not employ sensing threshold adjustment mechanisms.

Figure 4:
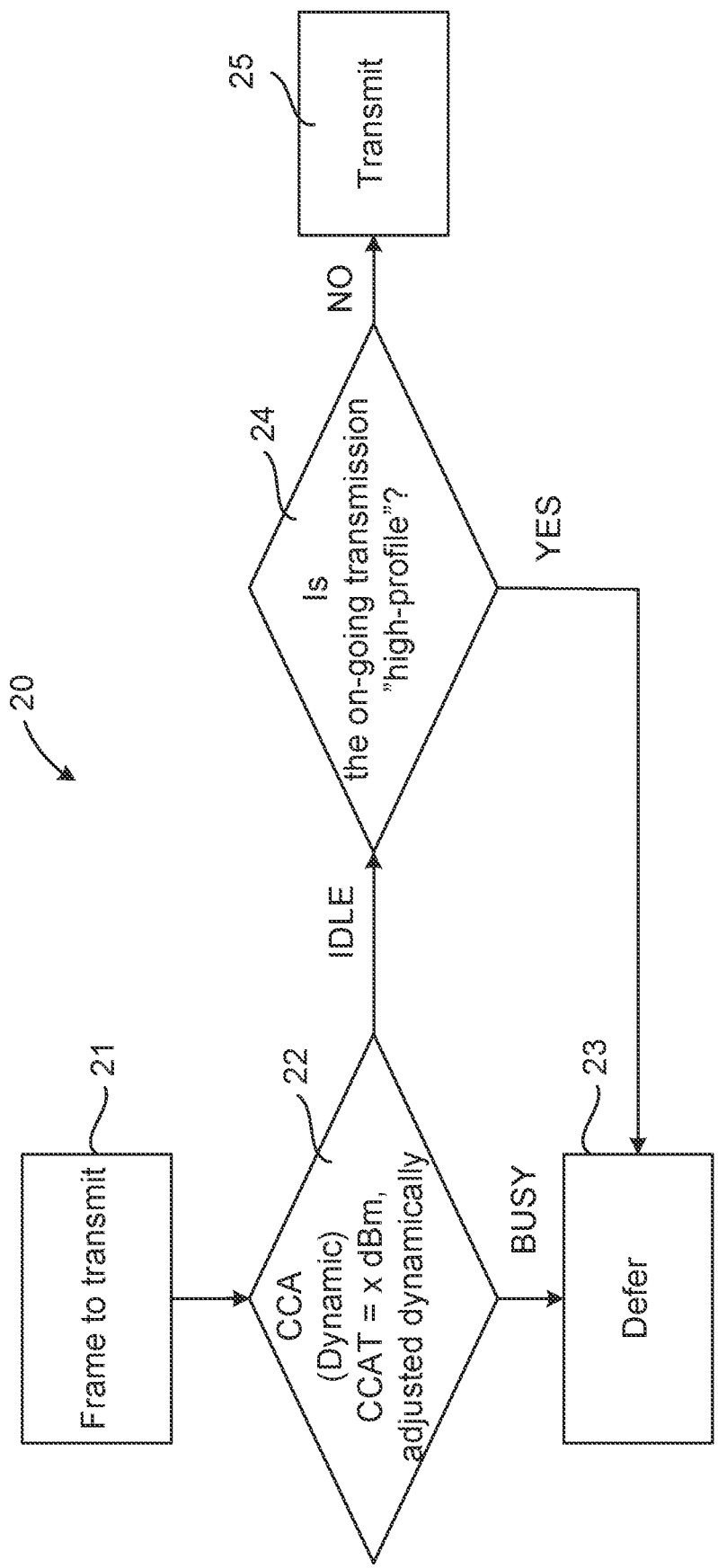
FIG. 4 is a flow chart illustrating a first channel assessment principle in accordance with the present teachings.

FIG. 4 illustrates a first example of the selective dynamic sensitivity threshold adjustment algorithm 20 according to the present teachings.

In box 21, a STA 11, 12 has a transmission unit to transmit. In the following the transmission unit is denoted a frame.

In box 22, the STA 11, 12 performs a CCA procedure for the channel(s) in order to establish whether it may go ahead and transmit the frame. The CCA procedure has a dynamically adjusted CCAT, as indicated in box 22 by "x dBm". A first dynamically adjusted CCAT value may for instance be −72 dBm (x=−72 dBm). The STA 11, 12 establishes whether any transmission can be found for which the received signal strength is stronger than the first CCAT, i.e. whether the channel is idle or busy. If, in box 22, it is determined that the channel is busy, flow continues to box 23 and the STA 11, 12 defers its transmission.

If, in box 22, the STA 11, 12 finds the channel to be idle in the sense that an on-going transmission has a received signal strength that is below the first CCAT value, flow continues to box 24. In box 24, even though the STA 11, 12 would be allowed to perform its transmission according to the first CCAT value, it checks fulfillment of a second criterion before actually performing the transmission. The STA 11, 12 checks whether the transmission that it detected is a high-impact transmission or not. If the detected transmission does not belong to this type of transmission, then flow continues to box 25 and the STA 11, 12 goes ahead with its transmission. If, on the other hand, the detected transmission is such a high-impact transmission, then the STA 11, 12 refrains from the transmission, and flow continues to box 23. In box 23, the STA 11, 12 defers its transmission, and may e.g. wait a random back-off period before again checking whether the transmission medium is deemed idle.

Figure 5:
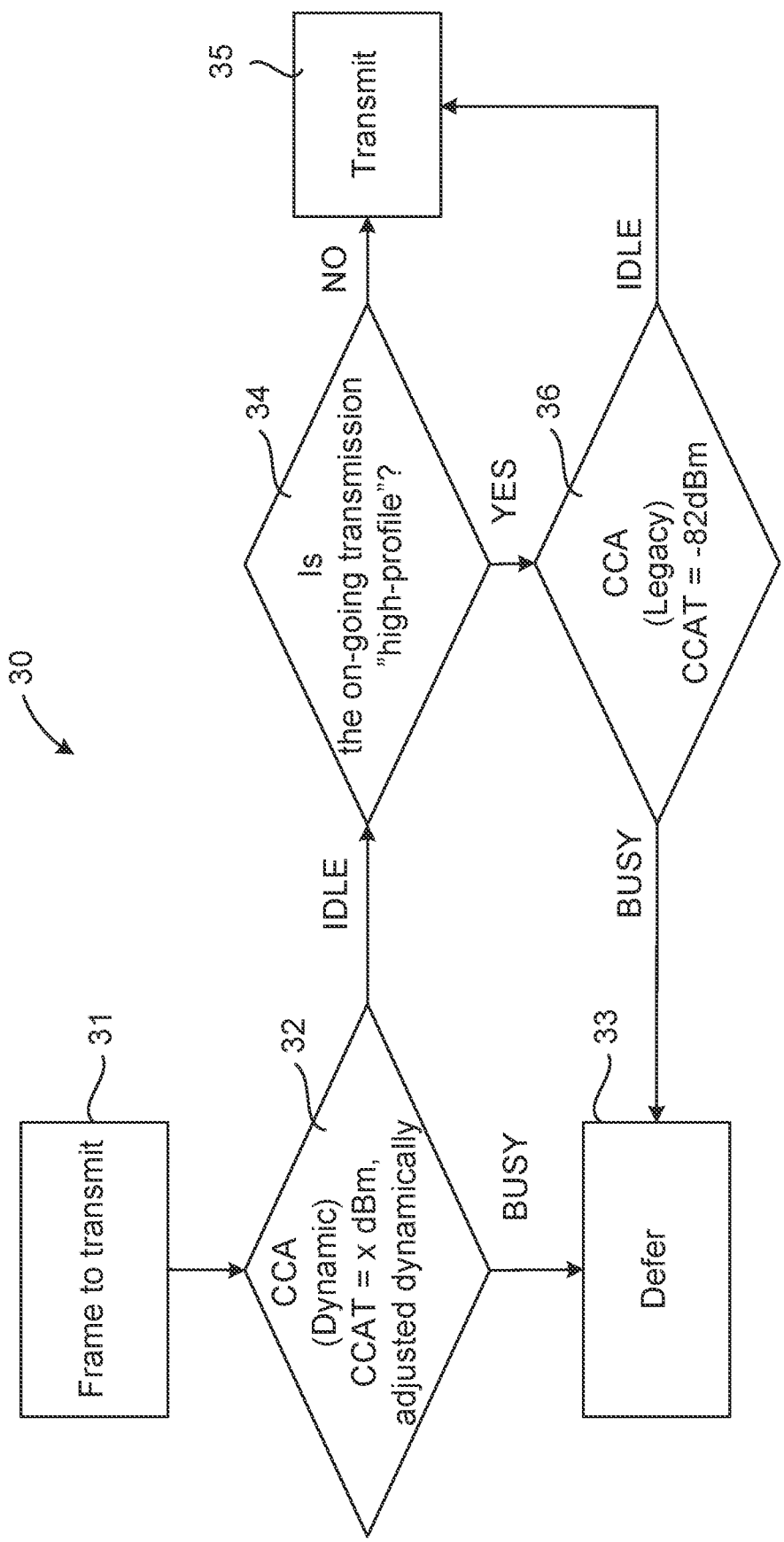
FIG. 5 is a flow chart illustrating a second channel assessment principle in accordance with the present teachings.

FIG. 5 illustrates another embodiment according to the present teachings, in particular, another example of the selective dynamic sensitivity threshold adjustment algorithm 30 according to the present teachings.

In box 31, a STA 11, 12 has a frame to transmit.

In box 32, the STA 11, 12 performs a CCA procedure for the channel(s) in order to establish whether it may go ahead and transmit the frame. The CCA procedure used has a CCAT that may be dynamically adjusted, as described earlier. The STA 11, 12 establishes whether any transmission can be found for which the received signal strength is stronger than the first CCAT, i.e. whether the channel is idle or busy. If, in box 32, it is determined that the channel is busy, flow continues to box 33 and the STA 11, 12 defers its transmission.

If, in box 32, the STA 11, 12 finds the channel to be idle in the sense that an on-going transmission has a received signal strength that is below the first CCAT value, flow continues to box 34.

In box 34, even though it would be allowed to, according to the first CCAT value, perform its transmission, the STA 11, 12 checks fulfillment of a second criterion before actually performing the transmission. The STA 11, 12 checks whether the transmission that it detected is a high-impact transmission or not, just like in the first algorithm described with reference to FIG. 4. If the detected transmission is such a high-impact transmission, flow continues to box 36.

In box 36, a third criterion is applied to determine whether or not to transmit the frame. The STA 11, 12 uses a second CCAT value in order to determine whether or not to transmit its frame. If the received signal strength of the detected transmission is higher than the second CCAT value, then flow continues to box 33 and the STA 11, 12 defers its transmission. The second CCAT value may be a more conservatively set threshold value, e.g. as the legacy static legacy CCAT, while the dynamically set CCAT value (box 32) may be a more "aggressively" set threshold value, allowing a higher number of simultaneous transmissions.

However, if the signal strength of the detected transmission is lower than the second CCAT then the STA 11, 12 goes ahead with the transmission of the frame anyway, i.e. simultaneously with the already on-going transmission.

The second CCAT is a less aggressive (more conservative) threshold than the first CCAT (box 32), whereby it is ensured that the on-going transmission is "heard" by the STA 11, 12 at such low signal strength level that it is not likely that its transmission in turn would cause interference to the on-going transmission, at least not to such an extent that the on-going transmission would fail. The STA 11, 12 performing the check and the station with the on-going transmission may for instance be located far apart from each other and it may be assumed that the transmissions will not interfere with each other to any high extent.

If, in box 34, the detected transmission does not belong to the high-impact type of transmission, then flow continues to box 35 and the STA 11, 12 goes ahead with its transmission.

In this second algorithm, when the STA 11, 12 evaluates the on-going transmission (box 32) and determines that it is indeed a high-impact one (box 34), it may revert back to using (box 36) a legacy CCAT with only a fixed CCAT (e.g. −82 dBm) in order to protect the high-impact transmission from additional interference.

In another embodiment, when a STA 11, 12 evaluates the on-going transmission and determines that it is indeed a high-impact one, it employs a less aggressive channel reuse mechanism (i.e. mechanism for determining whether a simultaneous transmission would be too interfering or not). Assuming for instance, that the STA 11, 12 is using a dynamic sensitivity threshold algorithm that yields, for instance based on load of the AP, a CCAT value of −62 dBm to be used when assessing the channel for a simultaneous transmission. Then, after determining that a particular on-going transmission is a high-impact one, the STA 11, 12 may use a lower value (<−62 dBm) for this particular simultaneous transmission occurrence.

In various embodiments, only particular types of transmissions are determined as being high-impact transmissions. One set of transmissions that may be classified as high-impact transmissions could be all multi user transmissions, i.e., transmissions that involve more than one receiving or transmitting device. These transmissions may, for instance, comprise all downlink and/or uplink OFDMA transmissions, and/or all downlink and/or uplink MU-MIMO transmissions. Another set of transmissions that could be classified as high-impact transmissions are transmissions related to control signaling, e.g. all IEEE 802.11 Control frames, comprising for instance request-to-send (RTS), clear-to-send (CTS), acknowledgements (ACKs), Poll frames, Very High Throughput Null Data Packet (VHT NDP) frames, etc.

In various embodiments, the STA 11, 12 may in different ways determine whether a particular transmission is to be considered as high-impact transmission. The STA 11, 12 may be configured to recognize the high-impact transmission types. One way to do this determination is to decode a MAC header of a frame from the on-going transmission and compare to a number of different types of frames that have been classified as high-impact frames. Another way is to decode a frame preceding the high-impact frames (i.e. high impact transmission) and thus acquire a priori information that a high-impact transmission will follow. For instance, many multi-user transmissions are preceded by a so-called "trigger frame", and a STA 11, 12 that wishes to perform a simultaneous transmission, could identify an up-coming high-impact transmission based on their "trigger frame".

In various embodiments, a physical layer (PHY) header is used in order to determine whether an overheard transmission (a frame thereof) is of a "high-impact" transmission type. The PHY header may comprise information related to multi-user reception. For instance, one field of a VHT signal A (VHT-SIG-A) is the "Group ID" field. This field has a value of 0 or 63 for single user frames, while a value between 1 and 62 indicates that the frame is addressed to multiple receivers. Hence, the STA 11, 12 may deduce that the transmission is intended for multiple receivers and thus establish that it is a high-impact transmission.

In summary, the present teachings provide a method, and an entity performing the method, by which the channel access based on selectively applying dynamic sensitivity threshold adjustment is based also on type of on-going transmission. If the on-going transmission is considered to be a high-profile one (e.g., OFDMA, MU-MIMO, RTS/CTS/ACK frame, etc.) then dynamic sensitivity threshold adjustment is either not applied or less aggressive threshold values are used.

The various embodiments and features that have been described may be combined in different ways, examples of which are given in the following with reference first to FIG. 6.

Figure 6:
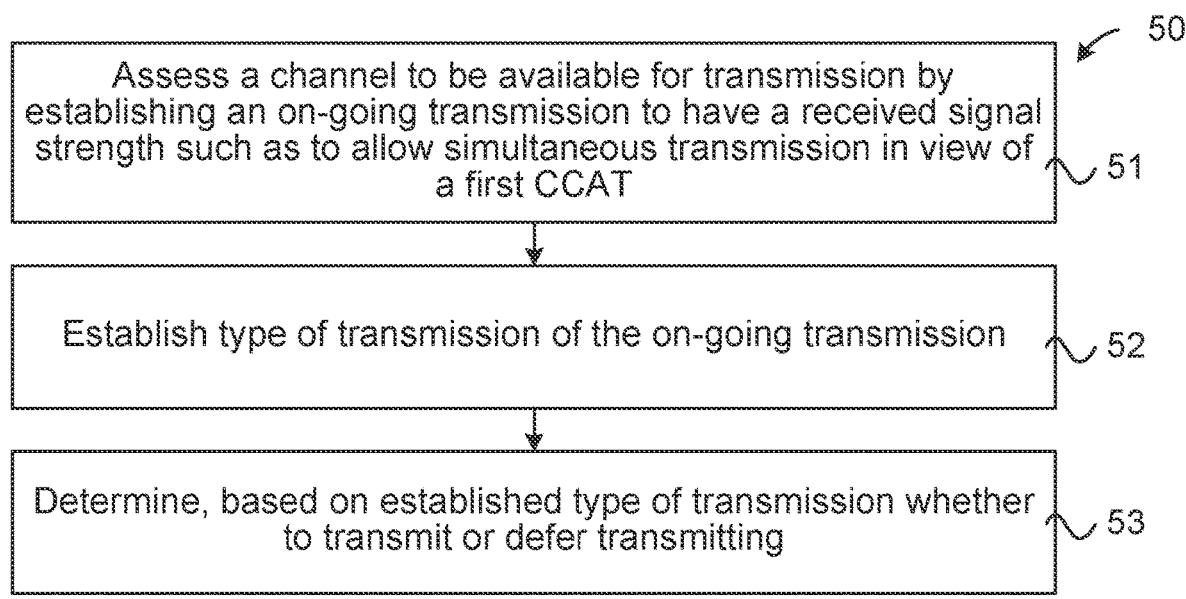
FIG. 6 illustrates a flow chart over steps of an embodiment of a method in an entity in accordance with the present teachings.

FIG. 6 illustrates a flow chart over steps of an embodiment of a method in an entity in accordance with the present teachings.

A method 50 for transmitting in a communications system 10 is provided that may be performed in an entity 11, 12. The method 50 comprises assessing 51 a channel to be available for transmission by establishing an on-going transmission to have a received signal strength such as to allow simultaneous transmission in view of a first clear channel assessment threshold.

The method 50 comprises establishing 52 type of transmission of the on-going transmission.

The method 50 comprises determining 53, based on the established type of transmission, whether to transmit or to defer transmitting.

In an embodiment, the determining 53 comprises determining to defer transmitting if the type of transmission comprises a first type and else determining to transmit simultaneously.

In various embodiments, the determining 53 is further based on a second clear channel assessment threshold.

In a variation of the above embodiment, the establishing 52 comprises establishing that the on-going transmission is of a first type, and wherein the determining 53 comprises determining to transmit simultaneously if the on-going transmission has a received signal strength such as to allow simultaneous transmission in view of the second clear channel assessment threshold.

In various embodiments, the first type of transmission comprises one or more of: a transmission addressed to two or more recipients, a transmission carrying information classified as important, a transmission comprising a request-to-send message, a transmission comprising a clear-to-send message, a multi-user multiple input multiple output, MU-MIMO, transmission, an orthogonal frequency division multiple access, OFDMA, transmission, a beacon frame, a control frame, a trigger frame preceding a first type of transmission.

In various embodiments, the establishing 52 type of transmission comprises decoding a medium access control, MAC, header and establishing type of transmission based on information in the MAC header. In other embodiments, the establishing 52 type of transmission comprises decoding a physical layer, PHY, header and establishing type of transmission based on information in the PHY header.

In various embodiments, the establishing 52 type of transmission comprises decoding a trigger frame preceding a first type of transmission and establishing type of transmission based on the trigger frame.

In various embodiments, the assessing 51 comprises establishing the first clear channel assessment threshold by a dynamic sensitivity threshold adjustment method.

Figure 7:
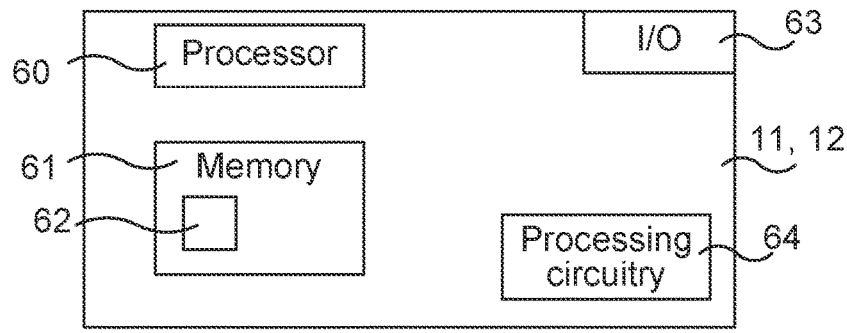
FIG. 7 illustrates schematically an entity and means for implementing embodiments of the method in accordance with the present teachings.

FIG. 7 illustrates schematically an entity and means for implementing embodiments of the method in accordance with the present teachings.

The entity 11, 12 comprises a processor 60 comprising any combination of one or more of a central processing unit (CPU), multiprocessor, microcontroller, digital signal processor (DSP), application specific integrated circuit etc. capable of executing software instructions stored in a memory 61 which can thus be a computer program product 61. The processor 60 can be configured to execute any of the various embodiments of the method for instance as described in relation to FIG. 6.

The memory 61 can be any combination of read and write memory (RAM) and read only memory (ROM), Flash memory, magnetic tape, Compact Disc (CD)-ROM, digital versatile disc (DVD), Blu-ray disc etc. The memory 61 may also comprise persistent storage, which, for example, can be any single one or combination of magnetic memory, optical memory, solid state memory or even remotely mounted memory.

The entity 11, 12 also comprises an input/output device 63 (indicated by I/O in FIG. 7) for communicating with other entities. Such input/output device 63 of the entity 11, 12 may comprise a wireless communication interface (e.g. radio interface) and/or wired communication interface.

The entity 11, 12 may also comprise additional processing circuitry, schematically indicated at reference numeral 64, for implementing the various embodiments according to the present teachings.

The present teachings provide computer programs 62 for the entity 11, 12. The computer program 62 comprises computer program code, which, when executed on at least one processor 60 of the entity 11, 12 causes the entity 11, 12 to perform the method 50 according to any of the described embodiments thereof.

The present disclosure also encompasses computer program products 61 comprising a computer program 62 for implementing the embodiments of the method as described, and a computer readable means on which the computer program 62 is stored. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

An entity 11, 12 for transmitting in a communications system 10 is provided. The entity 11, 12 is configured to: i) assess a channel to be available for transmission by establishing an on-going transmission to have a received signal strength such as to allow simultaneous transmission in view of a first clear channel assessment threshold, ii) establish type of transmission of the on-going transmission, and iii) determine, based on the established type of transmission, whether to transmit or to defer transmitting.

The entity 11, 12 may be configured to perform the above steps e.g. by comprising one or more processors 60 and memory 61, the memory 61 containing instructions executable by the processor 60, whereby the entity 11, 12 is operative to perform the steps. In case of several processors 60 (not illustrated) they may be configured to perform all steps of the method 50 or only part of the steps.

In an embodiment, the entity 11, 12 is configured to determine to defer transmitting if the type of transmission comprises a first type and else to transmit simultaneously.

In various embodiments, the entity 11, 12 is configured to determine further based on a second clear channel assessment threshold.

In various embodiments, the entity 11, 12 is establish by establishing that the on-going transmission is of a first type, and configured to determine to transmit simultaneously if the on-going transmission has a received signal strength such as to allow simultaneous transmission in view of the second clear channel assessment threshold.

In various embodiments, the first type of transmission comprises one or more of: a transmission addressed to two or more recipients, a transmission carrying information classified as important, a transmission comprising a request-to-send message, a transmission comprising a clear-to-send message, a multi-user multiple input multiple output, MU-MIMO, transmission, an orthogonal frequency division multiple access, OFDMA, transmission, a beacon frame, a control frame, a trigger frame preceding a first type of transmission.

In various embodiments, the entity 11, 12 is configured to establish type of transmission by decoding a medium access control, MAC, header and configured to establish type of transmission based on information in the MAC header. In other embodiments, the entity 11, 12 is configured to establish type of transmission by decoding a physical layer, PHY, header and configured to establish type of transmission based on information in the PHY header.

In various embodiments, the entity 11, 12 is configured to establish type of transmission by decoding a trigger frame preceding a first type of transmission and configured to establish type of transmission based on the trigger frame.

In various embodiments, the entity 11, 12 is configured to assess by establishing the first clear channel assessment threshold by a dynamic sensitivity threshold adjustment method.

Figure 8:
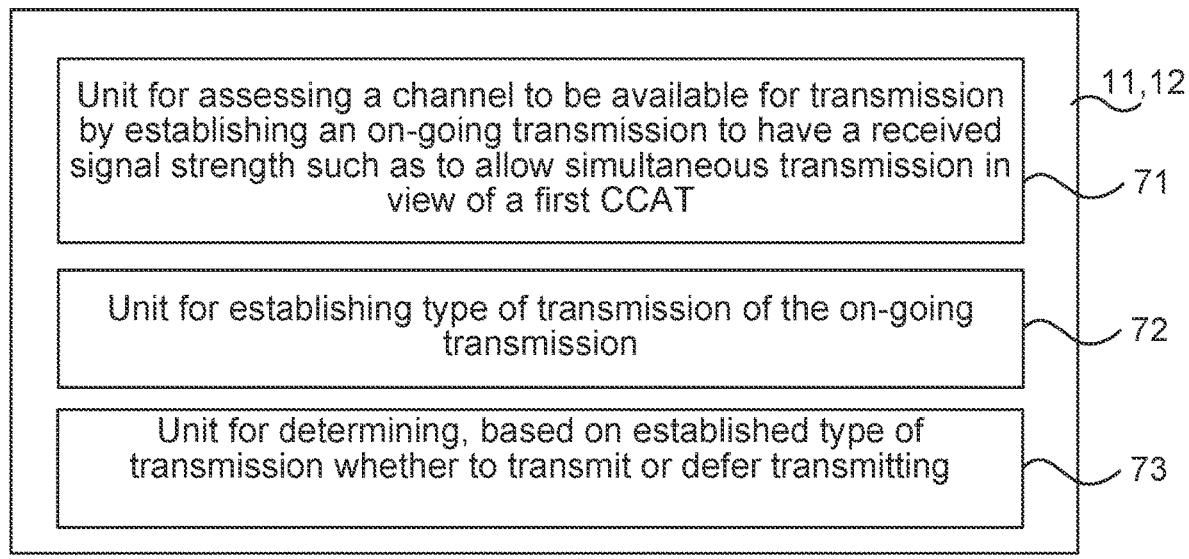
FIG. 8 illustrates an entity comprising function modules/software modules for implementing embodiments in accordance with the present teachings.

FIG. 8 illustrates an entity comprising function modules/software modules for implementing embodiments in accordance with the present teachings.

In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

An entity is provided for transmitting in a communications system. The entity comprises a first unit 71 for assessing a channel to be available for transmission by establishing an on-going transmission to have a received signal strength such as to allow simultaneous transmission in view of a first clear channel assessment threshold. Such first unit 71 may for instance comprise processing circuitry adapted for assessing a channel to be available for transmission by establishing an on-going transmission to have a certain received signal strength (e.g. unit 61, 62 and/or 64 described with reference to FIG. 7).

The entity comprises a second unit 72 for establishing type of transmission of the on-going transmission. Such second unit 72 may for instance comprise processing circuitry adapted for establishing type of transmission (e.g. unit 61, 62 and/or 64 described with reference to FIG. 7).

The entity comprises a third unit 73 for determining, based on the established type of transmission, whether to transmit or to defer transmitting. Such third unit 73 may for instance comprise processing circuitry adapted for determining, based on the established type of transmission, whether to transmit or to defer transmitting (e.g. unit 61, 62 and/or 64 described with reference to FIG. 7).

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method, the method comprising:
assessing a channel to be available for transmission by establishing an on-going transmission to have a received signal strength such as to allow simultaneous transmission in view of a first clear channel assessment threshold, wherein the first clear channel assessment threshold has a more aggressively set threshold value compared to a static clear channel assessment threshold in view of which the channel might have been assessed to be not available;

establishing type of transmission of the on-going transmission, and determining, based on the established type of transmission, whether to transmit data on the channel.

2. The method of claim 1, wherein the determining comprises determining to transmit the data as a result of determining that the type of transmission is not a first type.

3. The method of claim 2, wherein the first type of transmission comprises:
  a transmission addressed to two or more recipients,
  a transmission carrying information classified as important,
  a transmission comprising a request-to-send message,
  a transmission comprising a clear-to-send message,
  a multi-user multiple input multiple output (MU-MIMO) transmission,
  an orthogonal frequency division multiple access (OFDMA) transmission,
  a beacon frame,
  a control frame, and/or
  a trigger frame preceding a first type of transmission.

4. The method of claim 1, wherein the determining is further based on a second clear channel assessment threshold.

5. The method of claim 4, wherein the second clear channel assessment threshold has a value being either more conservatively set threshold value as the static clear channel assessment threshold, or being more aggressively set threshold value allowing a higher number of simultaneous transmissions.

6. The method of claim 4, wherein the establishing comprises establishing that the on-going transmission is of a first type, and wherein the determining comprises determining to transmit simultaneously as a result of determining that the on-going transmission has a received signal strength such as to allow simultaneous transmission in view of the second clear channel assessment threshold.

7. The method of claim 1, wherein the establishing type of transmission comprises:
  decoding a medium access control (MAC) header and establishing type of transmission based on information in the MAC header, or
  decoding a physical layer (PHY) header and establishing type of transmission based on information in the PHY header.

8. The method of claim 1, wherein the establishing type of transmission comprises decoding a trigger frame preceding a first type of transmission and establishing type of transmission based on the trigger frame.

9. The method of claim 1, wherein the assessing comprises establishing the first clear channel assessment threshold by a dynamic sensitivity threshold adjustment method.

10. The method of claim 1, wherein the static clear channel assessment threshold is −82 dBm.

11. A non-transitory computer readable stored medium storing a computer program for an entity for handling transmissions, the computer program comprising computer program code, which, when executed on at least one processor on the entity causes the entity to perform the method of claim 1.

12. An entity for transmitting in a communications system, the entity being configured to:
  assess a channel to be available for transmission by establishing an on-going transmission to have a received signal strength such as to allow simultaneous transmission in view of a first clear channel assessment threshold, wherein the first clear channel assessment threshold has a more aggressively set threshold value compared to a static clear channel assessment threshold in view of which the channel might have been assessed to be not available;
  establish type of transmission of the on-going transmission, and
  determine, based on the established type of transmission, whether to transmit.

13. The entity of claim 12, configured to determine to transmit the data as a result of determining that the type of transmission is not a first type.

14. The entity of claim 13, wherein the first type of transmission comprises:
  a transmission addressed to two or more recipients,
  a transmission carrying information classified as important,
  a transmission comprising a request-to-send message,
  a transmission comprising a clear-to-send message,
  a multi-user multiple input multiple output (MU-MIMO) transmission,
  an orthogonal frequency division multiple access (OFDMA) transmission,
  a beacon frame,
  a control frame, and/or
  a trigger frame preceding a first type of transmission.

15. The entity of claim 12, configured to determine further based on a second clear channel assessment threshold.

16. The entity of claim 15, wherein the second clear channel assessment threshold has a value being either more conservatively set threshold value as the static clear channel assessment threshold, or being more aggressively set threshold value allowing a higher number of simultaneous transmissions.

17. The entity of claim 15, configured to establish by establishing that the on-going transmission is of a first type, and configured to determine to transmit simultaneously as a result of determining that the on-going transmission has a received signal strength such as to allow simultaneous transmission in view of the second clear channel assessment threshold.

18. The entity of claim 12, configured to establish type of transmission by:
  decoding a medium access control (MAC) header and configured to establish type of transmission based on information in the MAC header, or
  decoding a physical layer (PHY) header and establishing type of transmission based on information in the PHY header.

19. The entity of claim 12, configured to establish type of transmission by decoding a trigger frame preceding a first type of transmission and configured to establish type of transmission based on the trigger frame.

20. The entity of claim 12, configured to assess by establishing the first clear channel assessment threshold by a dynamic sensitivity threshold adjustment method.

21. The entity of claim 12, wherein the static clear channel assessment threshold is −82 dBm.

* * * * *